US006618337B2

(12) United States Patent
Miyashita et al.

(10) Patent No.: US 6,618,337 B2
(45) Date of Patent: Sep. 9, 2003

(54) INFORMATION RECORDING AND REPRODUCTION APPARATUS

(75) Inventors: Harumitsu Miyashita, Osaka (JP); Shinichi Konishi, Nara (JP); Takeshi Nakajima, Nara (JP); Toshihiko Takahashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/770,778

(22) Filed: Jan. 26, 2001

(65) Prior Publication Data

US 2002/0018412 A1 Feb. 14, 2002

(30) Foreign Application Priority Data

Jan. 28, 2000 (JP) ....................................... 2000-019806

(51) Int. Cl.[7] .................................................. G11B 7/00
(52) U.S. Cl. .................................. 369/53.35; 369/53.31
(58) Field of Search ........................... 369/53.12, 53.13, 369/53.15, 53.16, 53.22, 53.27, 53.31, 53.35, 53.36, 47.54, 47.51, 47.53, 59.23, 59.24, 47.27, 47.24, 53.37; 360/83

(56) References Cited

U.S. PATENT DOCUMENTS 5,471,351 A * 11/1995 Ishiguro ...................... 360/53
5,563,851 A * 10/1996 Yamazaki ................ 369/53.36
5,677,802 A * 10/1997 Saiki et al. .............. 369/47.35
5,689,487 A * 11/1997 Iwanaga .................. 369/53.15
5,872,750 A * 2/1999 Satoh ...................... 369/47.14
5,982,718 A * 11/1999 Takiguchi ................ 369/53.36

FOREIGN PATENT DOCUMENTS

JP 62188067 A * 8/1987
JP 04070513 A * 3/1992
JP 09-055030 2/1997

* cited by examiner

*Primary Examiner*—Thang V. Tran
(74) *Attorney, Agent, or Firm*—Renner, Otto, Boisselle & Sklar

(57) ABSTRACT

An information recording and reproduction apparatus includes a recording section for recording data into a recording medium in accordance with address information recorded in the recording medium, a first reproduction section for reproducing at least one data including the data recorded in the recording medium in accordance with a first reproduction method to obtain at least one reproduced data, a second reproduction section for reproducing the address information in accordance with a second reproduction method to obtain reproduced address information, and a determination section for mapping the data to a specific reproduced data of the at least one reproduced data based on the address information and the reproduced address information, and comparing the data with the specific reproduced data to determine a recording condition of a region of the recording medium storing the data. The degree of influence of the recording condition of data recorded in the recording medium, on whether the data is correctly reproduced, is greater when the data is reproduced in accordance with the first reproduction method than with the second reproduction method.

6 Claims, 6 Drawing Sheets

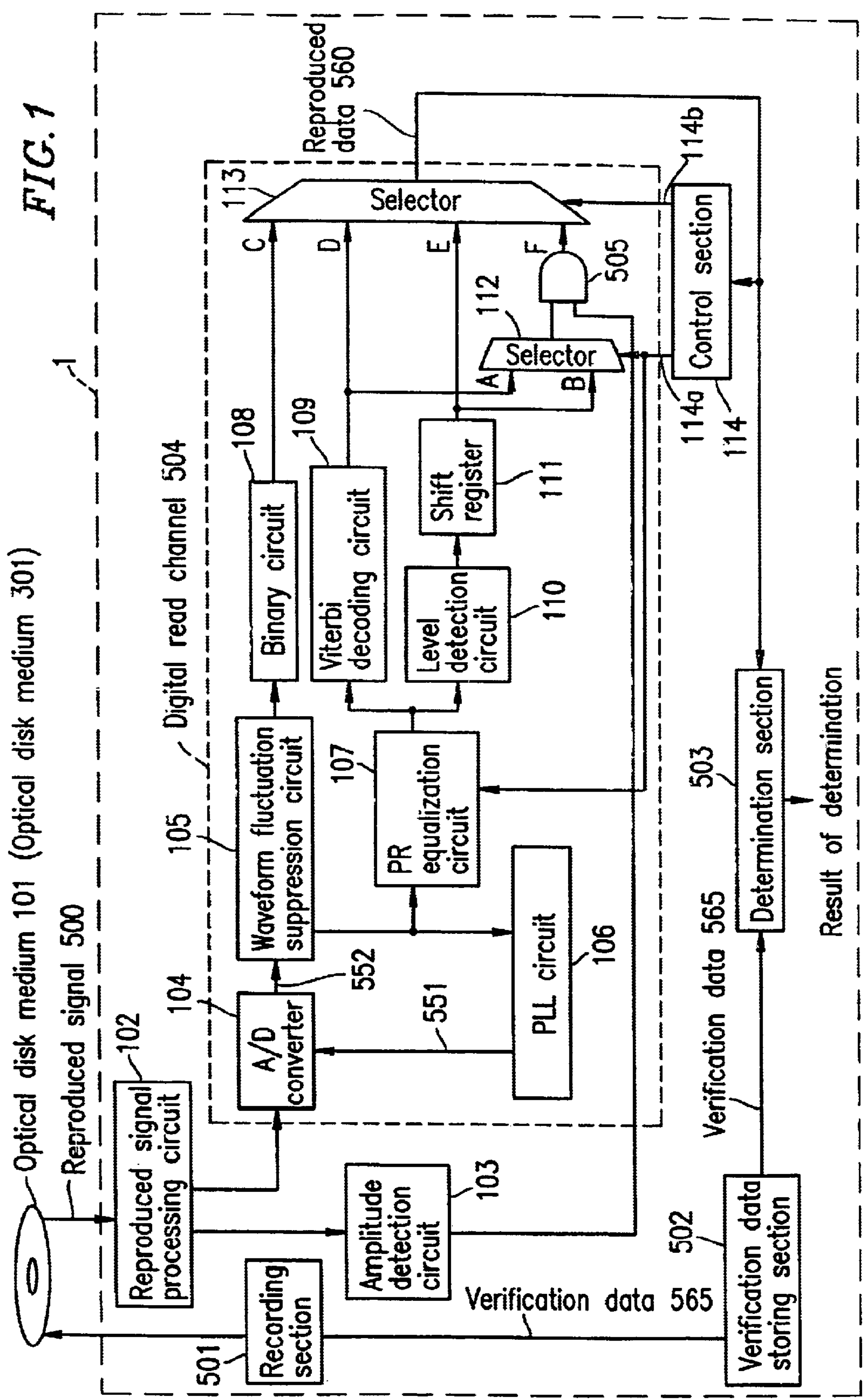
FIG. 1
1
Optical disk medium 101 (Optical disk medium 301)
Reproduced signal 500
Reproduced signal processing circuit
102
Digital read channel 504
A/D converter
104
552
551
Waveform fluctuation suppression circuit
105
PLL circuit
106
PR equalization circuit
107
Binary circuit
108
Viterbi decoding circuit
109
Level detection circuit
110
Shift register
111
Selector
112
A
B
505
F
C
D
E
Selector
113
Reproduced data 560
Control section
114
114a
114b
Amplitude detection circuit
103
Recording section
501
Verification data 565
Verification data storing section
502
Verification data 565
Determination section
503
Result of determination ID gate signal
451
401
453
High
Low
Amplitude (8bit)
100
50
0
−50
−100
0
0.5
1
1.5
2
2.5
3
Over sampling time (100M/s)
×10⁴
RF signal
452
402
454
End of previous sector data
GAP
CAPA1
CAPA2
GAP
VFO
USER DATA
455

INFORMATION RECORDING AND REPRODUCTION APPARATUS

BACKGROUND OF THE INVENTION

1. Field of the Invention

The present invention relates to an information recording and reproduction apparatus for recording and reproducing information to and from a recording medium such as an optical disk. More particularly, the present invention relates to an information recording and reproduction apparatus having a highly reliable verification operation for verifying the recording condition of a recording medium.

2. Description of the Related Art

Recently, for data recording media, there is a demand for a higher level of recording density. In the case of high-density data recording media, a reproduced signal may have a low level of S/N (signal-to-noise) ratio or a non-linear waveform. Correct data needs to be obtained from such reproduced signals.

Examples of a known method for reproducing information recorded in (or on) a recording medium includes the following methods (1) through (3):

(1) a method in which a reproduced signal is equalized and then changed into binary form (hereinafter referred to as "reproduction equalization and binary method");

(2) a method in which the waveform of a reproduced signal is shaped by partial response equalization, and a level of the shaped signal is detected, thereby reproducing information (hereinafter referred to as "PR equalization and level detection method"); and (3) a method in which information is reproduced by a combination of the PR equalization for waveform shaping of a reproduced signal, and a Viterbi decoding method which is one of so-called maximum likelihood decoding methods (hereinafter referred to as "PR equalization and Viterbi decoding method").

PRML (Partial Response Maximum Likelihood) methods, such as the PR equalization and Viterbi decoding method, can reduce errors which occur in data reproduction to considerable extent, compared to the conventional reproduction equalization and binary method and the PR equalization and level detection method. Therefore, the PRML method is widely used in techniques for processing signals recorded in high-density recording devices, such as an HDD (hard disk drive), a camera-recorder having a digital recording system, and a rewritable optical disk.

As for a removable medium such as an optical disk, there may be a high level of variation in a characteristic between individual disks or optical disk apparatuses. Conditions upon recording (recording condition) need to be optimized in order to prevent errors from occurring when information is reproduced from the same disk by optical disk apparatuses having different characteristics.

In an optical disk apparatus or the like, recorded data is read out, for example, in a verification operation after data recording, in format checking, in data reproduction, and the like. If the PR equalization and Viterbi decoding method is used every time recorded data is read out, the recorded data can be correctly reproduced even when the recording condition is not good (i.e., an error is likely to occur in reproduction). This is not always beneficial. In the verification operation after data recording, the recording condition is checked by detecting an error. When the PR equalization and Viterbi decoding method is used in the verification operation, a poor recording condition may be overlooked. Therefore, the verification operation is less reliable.

Japanese Laid-open Publication No. 9-55030 discloses a technique for solving such a problem. In the technique disclosed in Japanese Laid-open Publication No. 9-55030, either the PR equalization and level detection method or the PR equalization and Viterbi decoding method is used upon normal reproduction, while the reproduction equalization and binary method is used upon a verification operation. In this case, whereas an error rate in normal reproduction is reduced, a recording condition can be checked more strictly. Alternatively, there is a known technique in which the PR equalization and Viterbi decoding method is used upon normal reproduction, while the PR equalization and level detection method is used upon a verification operation.

In an optical disk having physical addresses (PID) such as prepit addresses, the optimal focus position of an optical head in reading data from a physical address region differs from that in reading data from a data region. In this case, if the focus position of the optical head is optimized for the data region, the optical head is defocused upon reading data from the physical address region and therefore an error is likely to occur. When either the PR equalization and level detection method or the PR equalization and Viterbi decoding method is used upon a verification operation as in conventional techniques, an address may fail to be precisely reproduced. If an address is not precisely reproduced, the recording condition is not correctly checked, thereby causing the verification operation to be less reliable.

SUMMARY OF THE INVENTION

According to one aspect of the present invention, an information recording and reproduction apparatus comprises: a recording section for recording data into a recording medium in accordance with address information recorded in the recording medium; a first reproduction section for reproducing at least one data including the data recorded in the recording medium in accordance with a first reproduction method to obtain at least one reproduced data; a second reproduction section for reproducing the address information in accordance with a second reproduction method to obtain reproduced address information; and a determination section for mapping the data to a specific reproduced data of the at least one reproduced data based on the address information and the reproduced address information, and comparing the data with the specific reproduced data to determine a recording condition of a region of the recording medium storing the data. The degree of influence of the recording condition of data recorded in the recording medium, on whether the data is correctly reproduced, is greater when the data is reproduced in accordance with the first reproduction method than with the second reproduction method.

In one embodiment of this invention, the address information is previously recorded in the form of a prepit in the recording medium.

In one embodiment of this invention, the recording section further records the address information into the recording medium, In one embodiment of this invention, the data is recorded as a recorded signal in the recording medium, the information recording and reproduction apparatus further comprises an amplitude detection section for detecting an amplitude of the recorded signal, and the determination section performs determination of the recording condition, depending on whether the amplitude detected by the amplitude detection section is greater than a predetermined amplitude.

In one embodiment of this invention, the data is recorded as a first recorded signal in the recording medium. In the first reproduction method, the first recorded signal is equalized in accordance with a partial response method, and thereafter the equalized first recorded signal is subjected to level detection to obtain the first reproduced data. The address information is recorded as a second recorded signal in the recording medium. In the second reproduction method, the second recorded signal is equalized in accordance with the partial response method, and thereafter the equalized second recorded signal is subjected to Viterbi decoding to obtain the second reproduced data.

In one embodiment of this invention, a time from when the first reproduction section starts reproducing the data recorded in the recording medium until when the first reproduction section starts outputting reproduced data obtained by reproducing the data, is equal to a time from when the second reproduction section starts reproducing the data recorded in the recording medium until when the second reproduction section starts outputting reproduced data obtained by reproducing the data.

Thus, the invention described herein makes possible the advantage of providing an information recording and reproduction apparatus having a highly reliable verification operation.

These and other advantages of the present invention will become apparent to those skilled in the art upon reading and understanding the following detailed description with reference to the accompanying figures.

BRIEF DESCRIPTION OF THE DRAWINGS

FIG. 1 is a diagram showing an information recording and reproduction apparatus 1 according to an embodiment of the present invention.

DESCRIPTION OF THE PREFERRED EMBODIMENTS

Figure 2:
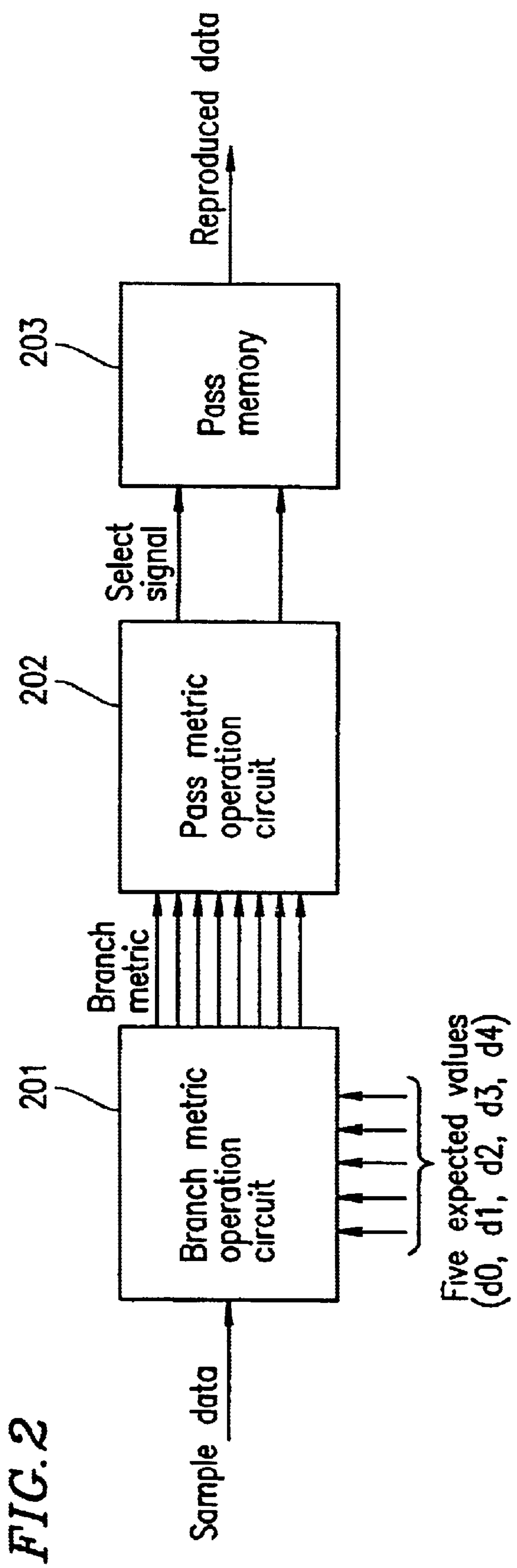
FIG. 2 is a diagram showing a structure of a Viterbi decoding circuit 109.

First, three reproduction methods used in an information recording and reproduction apparatus according to the present invention, i.e., a reproduction equalization and binary method, a PR equalization and level detection method, and a PR equalization and Viterbi decoding method, will be described. In the following description, a recording medium used in the information recording and reproduction apparatus of the present invention is an optical disk, but the invention is not limited to such a medium.

Reproduction Equalization and Binary Method

A reproduced signal from an optical disk contains a fluctuating low-frequency component due to fluctuation of the reflectance of the optical disk, defocusing, deviation of a beam from the center of a track, and the like. In the reproduction equalization and binary method, a reproduced signal is input to a reproduction equalizer such as a high-pass filter to remove such fluctuation, and a clock synchronized with a waveform output from the equalizer is extracted by a PLL circuit. The reproduced signal is converted into a binary signal "0" or "1" where the center (DC level) of the amplitude of the reproduced signal is used as a threshold (binary process).

PR Equalization and Level Detection Method

As described above, fluctuation of low-frequency components occur in the recording and reproduction system for an optical disk. Information is recorded as marks and spaces in (or on) an optical disk, in higher-density recording, the waveforms of signals reproduced from adjacent marks interfere with each other, and readout error is likely to occur. Such a phenomenon is called inter-symbol interference. In PR equalization, the inter-symbol interference is intentionally introduced, and sampled data are weighted depending on the transfer characteristic of the optical system of an information recording and reproduction apparatus.

There are a number of types of PR equalization. It is necessary to select a type of PR equalization conformable to a frequency characteristic of a recording medium. In the case of an optical disk, especially DVD (Digital Versatile Disk), it is necessary to select a type of PR equalization conformable to the optical frequency characteristic MTF (Modulation Transfer Function), taking into account a recording symbol 8/16 frequency characteristic.

For example, when PR(3,4,4,3) closely conformable to the DVD's MTF characteristic is selected, the output signal of a PR equalizer has 5 values. The output signal is converted to a binary signal having a value of "0" or "1" in the following way. For example, data sampled at an arbitrary sampling point is added to data sampled at a sampling point immediately before the arbitrary sampling point. Whether the sum is greater than a given threshold is determined (level detection).

PR Equalization and Viterbi Decoding Method

In a system using the PR equalization and level detection method, bit errors occur if PR equalization cannot shape sampling data into a desired waveform due to the above-described fluctuation or noise caused by a recording condition, a reproduction circuit and the like. In the PR equalization and Viterbi decoding method, Viterbi decoding is used in place of level detection in order to reduce a bit error rate. The PR equalization and Viterbi decoding method is a PRML method.

Viterbi decoding differs from level detection in which input signal is converted to "0" or "1" with reference to a given threshold. In Viterbi decoding, the most probable data sequence is determined based on a previous digitized data sequence. When PR(3,4,4,3) equalization, which is closely conformable to the DVD's MTF characteristic, is selected as PR equalization, Viterbi decoding has 6 states and 16 state transition paths. When an 8/16 code in conformity with the DVD standards is used, Viterbi decoding has 6 states and 8 state transition paths. The number of expected values which is determined depending on the symbol length of PR equalization is five.

In the reproduction equalization and binary method of the above-described three reproduction methods, the recording condition of data recorded in a recording medium has the most influence on whether the data is correctly reproduced. That is, a poor recording condition of data leads to a great increase in probability that the data is not correctly reproduced. The probability that data is not correctly reproduced is represented quantitatively by a bit error rate or a byte error rate, for example.

In contrast, in the PR equalization and Viterbi decoding method of the above-described three reproduction methods, the recording condition of data recorded in a recording medium has the least influence on whether the data is correctly reproduced. That is, a poor recording condition of data does not lead to a great increase in probability that the data is not correctly reproduced.

Further, when the recording condition of data is ideal, the probability that the data is not correctly reproduced is believed to be low in any of the three reproduction methods (e.g., the probability is negligibly small). In the PR equalization and Viterbi decoding method, the probability that the data is not correctly reproduced is lowest even when the recording condition of data is less than Ideal.

For any of the reproduction methods, the influence of the recording condition of data recorded in a recording medium on whether the data is correctly reproduced may be determined, for example, by comparing the bit error rates occurring when data recorded in two recording media having different recording conditions, are reproduced.

In addition, when an optical head is defocused upon reproduction, i.e., the focus condition (focus position) of the optical head deviates from an optimal focus position, data is unlikely to be correctly reproduced. In a reproduction method in which the recording condition of data recorded in a recording medium has a great influence on whether the data is correctly reproduced, the focus condition upon reproduction also has a great influence on whether the data is correctly reproduced.

Hereinafter, the present invention will be described by way of illustrative examples with reference to the accompanying drawings.

FIG. 1 shows an information recording and reproduction apparatus 1 according to an embodiment of the present invention.

The information recording and reproduction apparatus 1 includes a recording section 501 for recording data (verification data) in an optical disk medium 101; a digital read channel 504 for reproducing data recorded in the optical disk medium 101; a control section 114 for switching reproduction methods used in the digital read channel 504; and a determination section 503 for determining a recording condition of a region of the optical disk medium 101 by comparing verification data with reproduced data upon verification operation.

A description will be given below of a process for reproducing data recorded in the optical disk medium 101.

A reproduced signal 500 read out from the optical disk medium 101 by an optical head (not shown) is input to a reproduced signal processing circuit 102. The reproduced signal processing circuit 102 subjects the reproduced signal 500 to waveform shaping in order to reduce fluctuation and waveform interference. The waveform-shaped reproduced signal is input to an A/D converter 104 and an amplitude detection circuit 103.

The optical disk medium 101 is, for example, an optical disk 300 which is described below with reference to FIG. 3A.

A sampling signal 552 sampled by the A/D converter 104 is input to a waveform fluctuation suppression circuit 105. The waveform fluctuation suppression circuit 105 suppresses waveform fluctuation such as a defect. That is, the waveform fluctuation suppression circuit 105 performs reproduction equalization.

A PLL circuit 106 generates a clock signal 551 synchronized with an output signal from the waveform fluctuation suppression circuit 105, and outputs the clock signal 551 to the A/D converter 104. The A/D converter 104 samples the reproduced signal in accordance with the clock signal 551, thereby obtaining a sampled signal 552. The sampled signal 552 is input through the waveform fluctuation suppression circuit 105 to a binary circuit 108 and a PR equalization circuit 107.

The binary circuit 108 converts a signal output from the waveform fluctuation suppression circuit 105 to a binary signal, and outputs the binary signal as data C to a selector 113.

The selector 113 selects one of four inputs, data C to F, in response to a select signal 114*b* output from the control section 114, and outputs the selected data as reproduced data 560. When the selector 113 selects data C, the data obtained by the processes of the A/D converter 104, the waveform fluctuation suppression circuit 105 and the binary circuit 108 is output as the reproduced data 560 from the selector 113. In other words, data obtained by reproducing data recorded in the optical disk medium 101 in accordance with the reproduction and binary method is output as the reproduced data 560 from the selector 113.

The reproduction and binary method is used in reproducing an optical disk (e.g., CD (compact disc)) which is not conformable to a frequency characteristic of PR(3,4,4,3) equalization closely conformable to the DVD's MTF characteristic. Note that when the information recording and reproduction apparatus 1 is intended never to reproduce such an optical disk medium, the binary circuit 108 can be omitted.

The PR equalization circuit 107 performs PR equalization of a signal output from the waveform fluctuation suppression circuit 105. The PR-equalized signal is input to a Viterbi decoding circuit 109 and a level detection circuit 110.

The Viterbi decoding circuit 109 performs the above-described Viterbi decoding of the PR-equalized signal, and outputs the resultant signal as data D to the selector 113 and also as data A to a selector 112. A structure of the Viterbi decoding circuit 109 will be described later with reference to FIG. 2.

The level detection circuit 110 performs the above-described level detection of the PR-equalized signal, and outputs the resultant data to a shift register 111. The shift register 111 delays data output from the level detection circuit 110, and outputs the delayed data as data E to the selector 113 and also as data B to the selector 112.

The selector 112 selects one of the two inputs, data A and data B, in response to an ID gate signal 114*a* output from the control section 114, and outputs the selected data as data F through an AND gate 505. Specifically, the selector 112 selects data A when the ID gate signal 114*a* is at a High level or data B when the ID gate signal 114*a* is at a Low level. When the selector 113 selects data E or when the selector 112 selects data B and the selector 113 selects data F, data obtained by the processes of the A/D converter 104, the waveform fluctuation suppression circuit 105, the PR equalization circuit 107 and the level detection circuit 110 is output as the reproduced data 560 to the selector 113. In other words, data obtained by reproducing data recorded in the optical disk medium 101 in accordance with the PR equalization and level detection method is output as the reproduced data 560 from the selector 113.

When the selector 113 selects data D or when the selector 112 selects data A and the selector 113 selects data F, data obtained by the processes of the A/D converter 104, the waveform fluctuation suppression circuit 105, the PR equalization circuit 107 and the Viterbi decoding circuit 109 is output as the reproduced data 560 from the selector 113. In other words, data obtained by reproducing data recorded in the optical disk medium 101 in accordance with the PR equalization and Viterbi decoding method is output as the reproduced data 560 from the selector 113.

Upon normal reproduction (not reproduction for a verification operation), the selector 113 outputs data selected from data C, D and E as the reproduced data 560 in accordance with the select signal 114*b* from the control section 114. For example, when the optical disk medium 101 is a CD, the control section 114 outputs to the selector 113 a select signal 114*b* which causes the selector 113 to select data C.

FIG. 2 shows a structure of the Viterbi decoding circuit 109. The Viterbi decoding circuit 109 includes a branch metric operation circuit 201, a pass metric operation circuit 202, and a pass memory 203. The operation of the Viterbi decoding circuit 109 will be described below.

When PR(3,4,4,3) equalization is used, the number of expected values is five, and five different expected values [d0, d1, d2, d3, d4] are input to the branch metric operation circuit 201. The branch metric operation circuit 201 calculates a branch metric every channel clock cycle. The branch metric is a squared error between input sample data (PR equalized signal) and the five expected values [d0, d1, d2, d3, d4].

The pass metric operation circuit 202 accumulates a branch metric every channel clock cycle to calculate a pass metric. Thereafter, the pass metric operation circuit 202 outputs to the pass memory 203 a select signal which is used to select a data sequence having the least pass metric, i.e., the most probable data sequence.

The pass memory 203 stores a plurality of candidate sequences, and outputs a data sequence in accordance with a select signal received from the pass metric operation circuit 202. The longer the length of a memory which stores a data sequence, the higher the probability that the data sequence is correctly output (i.e., reproduction performance is increased), However, a longer memory length leads to an increase in circuit size. The memory length of the pass memory 203 is determined by considering the tradeoff between performance and circuit size.

Next, an optical disk having physical addresses (PID) will be described by exemplifying a DVD-RAM disk medium. The PID is an address which is previously recorded on a disk surface in the form of concave and convex pits (prepits) Therefore, such a PID is called a "prepit address".

Figure 3A:
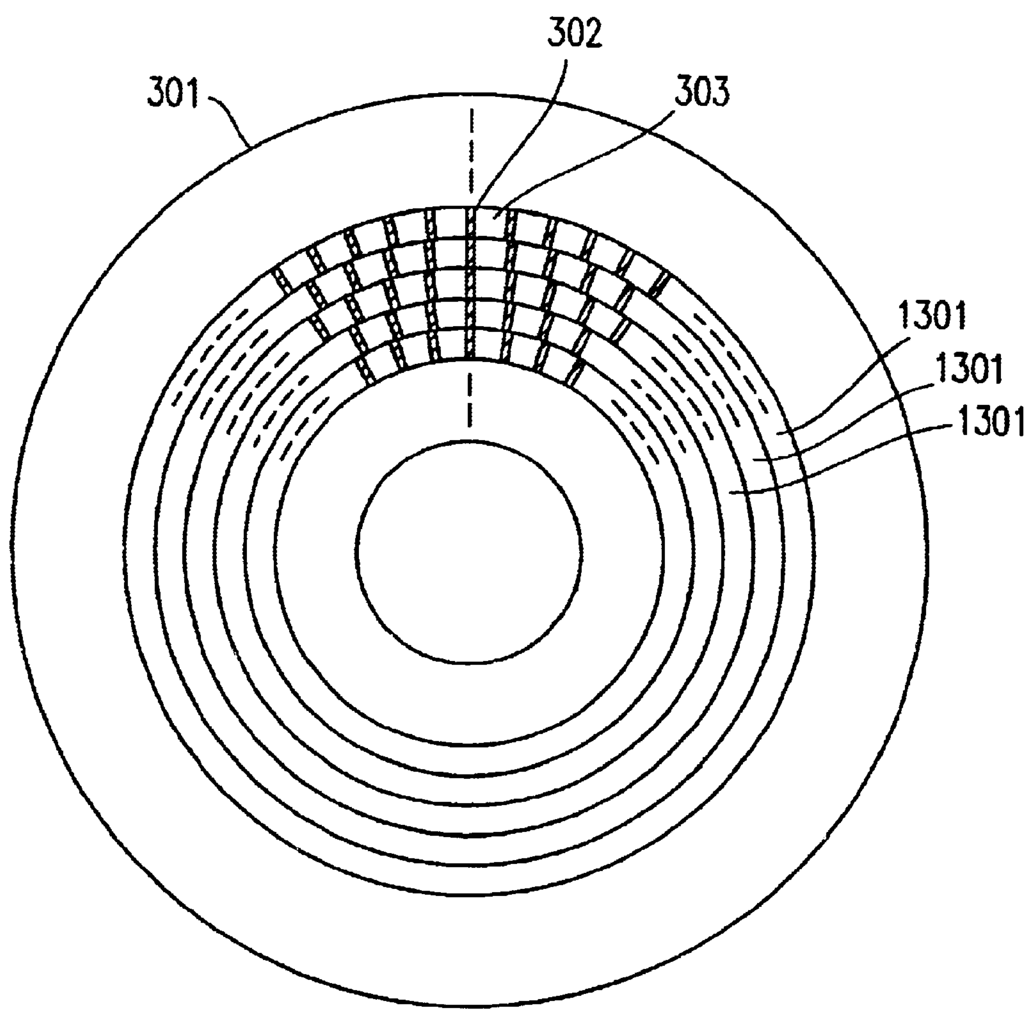
FIG. 3A is a diagram showing a region of an optical disk medium 301 in which data is recorded.

FIG. 3A shows a region of the optical disk medium 301 on which data is recorded. The optical disk medium 301 includes an address region 302 for identifying a position on the disk and a user data region 303 for storing user data, which are provided on a surface of the disk. The optical disk medium 301 includes at least one track 1301. The track 1301 may be in the form of a concentric circle or a spiral.

Figure 3B:
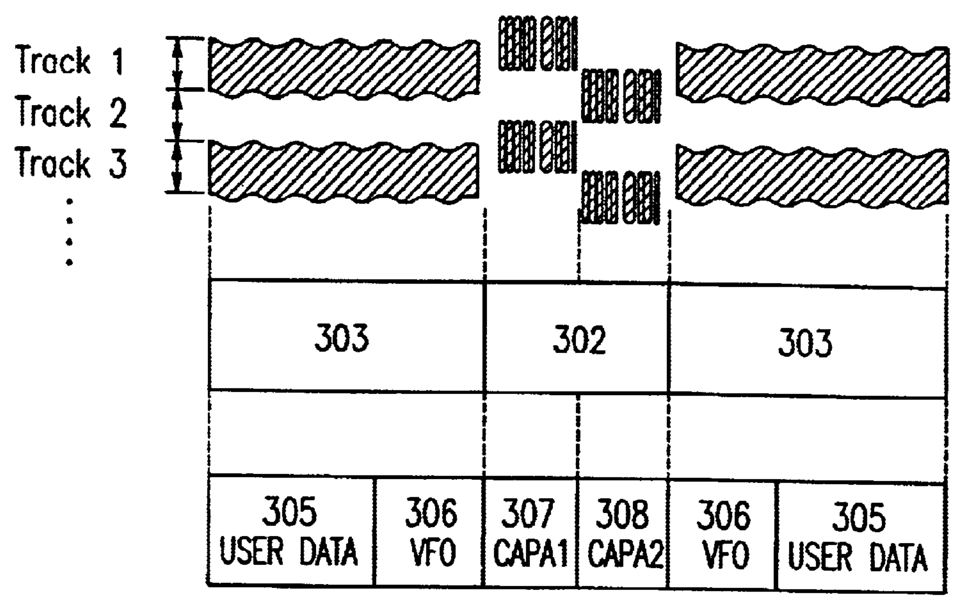
FIG. 3B is a diagram showing a region of the optical disk medium 301 of FIG. 3A including an address region 302.

FIG. 3B shows a region of the optical disk medium 301 including the address region 302. In FIG. 3B, the address regions 302 are shown for three tracks (track 1 through track 3). In each address region 302, CAPA1 data 307 and CAPA2 data 308 are recorded. The CAPA1 data 307 and CAPA2 data 308 define address information which is previously recorded in the form of prepits in the optical disk medium 301.

In the user data region 303, USER DATA data 305 and VFO data 306 are recorded. A region in the optical disk medium 301 is indicated by address information (the CAPA1 data 307 and CAPA2 data 308). Note that the term "user data" herein includes data used for a verification operation (verification data) which is recorded in the user data region 303 by the information recording and reproduction apparatus 1 upon a verification operation, Referring to FIG. 1 again, the operation of the information recording and reproduction apparatus 1 upon a verification operation will be described below. In the following description, the optical disk medium shown in FIGS. 3A and 3B is used as the optical disk medium 101.

The verification operation is executed in accordance with steps S1101 through S1104 described below, for example.

In step S1101: a specific address in the optical disk medium 301 is designated; and a verification data 565 is recorded in a specific user data region indicated by the designated address. The verification data 565 may be a predetermined data stored in a verification data storing section 502 or data generated upon each verification operation. In this way, the recording section 501 records the verification data 565 in a recording medium in accordance with a designated address (address information).

In step S1102: at least one data recorded in the user data region 303 of the optical disk recording medium 301 is reproduced by the digital read channel 504, thereby obtaining at least one reproduced user data. The at least one data recorded in the user data region 303 includes the verification data 565 which has been recorded in step S1101. Further, address information recorded in the address region 302 is reproduced by the digital read channel 504, thereby obtaining the reproduced address information. The reproduced user data and address information are input as the reproduced data 560 to the determination section 503.

In step S1103: of the at least one reproduced user data, specific data read out from a region of the optical disk medium 301 indicated by the specific address designated in step S1101 is mapped to the verification data 565. From which region in the optical disk medium 301 the specific data is read out is determined based on the reproduced address information. Therefore, the mapping of the specific data to the verification data 565 is performed based on the address information and the reproduced address information.

In step S1104: the verification data 565 is compared with the specific data which has been mapped to the verification data 565 in step S1103. Based on the comparison, the recording condition of a region of the optical disk medium 301 in which the specific data is recorded is determined. For example, if the specific data is identical to the verification data 565, the recording condition is determined to be good. If the specific data is at least partially different from the verification data 565, the recording condition is determined to be poor.

The verification operation of the optical disk medium 301 is performed by executing the procedures of steps S1101 through S1104. When the recording condition is determined in step S1104 to be poor, a parameter (e.g., the focus position of an optical head) upon recording the verification data may be modified and thereafter the procedures of steps S1101 through S1104 may be executed.

Upon a verification operation, the control section 114 outputs to the selector 113 a select signal 114*b* which causes the selector 113 to select data F. In the above-described step S1102, the reproduction of data recorded in the user data region 303 is performed in accordance with the PR equalization and level detection method, while the reproduction of data recorded in the address region 302 is reproduced in accordance with the PR equalization and Viterbi decoding method. Such switching of the reproduction methods, i.e., how the control section 114 generates the ID gate signal 114*a*, will be described later with reference to FIG. 4.

When data recorded in the optical disk medium 301 is reproduced in accordance with the PR equalization and Viterbi decoding method, even if the recording condition of the data is not good, the data is likely to be correctly reproduced. In contrast, when data recorded in the optical disk medium 301 is reproduced in accordance with the PR equalization and level detection method, if the recording condition of the data is not good, the data is unlikely to be correctly reproduced Thus, the recording condition of data recorded in a recording medium 301 has more influence on whether the data is correctly reproduced, when the data is reproduced in accordance with the PR equalization and level detection method, than when the data is reproduced in accordance with the PR equalization and Viterbi decoding method. Note that the degree of such influence in the case of the PR equalization and Viterbi decoding method, the PR equalization and level detection method, and the reproduction equalization and binary method, increases in this order.

As described above, the PR equalization circuit 107, the level detection circuit 110 and the shift register 111 together serve as a first reproduction section for reproducing at least one data including verification data recorded in the optical disk medium 301 in accordance with the PR equalization and level detection method (first reproduction method) to obtain at least one reproduced user data (reproduced data). The PR equalization circuit 107 and the Viterbi decoding circuit 109 together serve as a second reproduction section for reproducing address information recorded in the optical disk medium 301 in accordance with the PR equalization and Viterbi decoding method (second reproduction method) to obtain the reproduced address information.

In the above-described structure of the information recording and reproduction apparatus 1, the reproduced address information is obtained in accordance with the PR equalization and Viterbi decoding method. Therefore, even when the recording condition of address information recorded in the optical disk medium 301 is poor (or in the case of defocusing), the address information is correctly reproduced. Therefore, in step S1103, the mapping of the specific data to the verification data 565 based on the address information and the reproduced address information is correctly performed. Further, the specific data is obtained in accordance with the PR equalization and level detection method. Therefore, if the recording condition of the verification data 565 recorded in the optical disk medium 301 is not good, the probability that the verification data 565 is correctly reproduced is low. Thus, when the verification data 565 is compared with the specific data (obtained by reproducing the verification data 565) in step S1104, the probability that the verification data 565 is identical to the specific data is low. In other words, the probability that a poor recording condition is correctly detected is high. Therefore, a recording condition can be strictly checked, thereby improving the reliability of the verification operation. When the optical disk medium 301 has passed such a strict check, if data is recorded in the optical disk medium 301 using a parameter (e.g., the focus position of an optical head) which has been used upon verification operation, the recording condition of the optical disk medium 301 is greatly improved. With the optical disk medium 301 having an excellent recording condition, an error rate upon normal reproduction can be reduced.

Next, a function of the shift register 111 will be described.

As described above with reference to FIG. 2, in the Viterbi decoding circuit 109, the pass memory 203 requires a given pass-memory length. In the Viterbi decoding circuit 109, reproduced data is delayed depending on the pass-memory length.

In the level detection circuit 110, the amount of delay of reproduced data is generally less than the amount of delay of reproduced data in the Viterbi decoding circuit 109. The shift register 111 has a function of generating a delay amount corresponding to the difference in the amounts of delay between the Viterbi decoding circuit 109 and the level detection circuit 110. The provision of such a shift register 111 leads to prevention of deviation from the synchronization of data A and data B input to the selector 112 (i.e., preventing timing inconsistency). Therefore, if data A and data B input to the selector 112 are continuously switched in accordance with the ID gate signal 114*a*, the continuity of the reproduced data 560 is secured. Thus, the delay amount of the shift register 111 is determined so that a time from when the first reproduction section including the PR equalization circuit 107, the level detection circuit 110 and the shift register 111, starts reproducing data recorded in the optical disk medium 301 until when the first reproduction section starts outputting data B (reproduced data) obtained by reproducing the data, is equal to a time from when the second reproduction section including the PR equalization circuit 107 and the Viterbi decoding circuit 109, starts reproducing data recorded in the optical disk medium 301, until when the second reproduction section starts outputting data A (reproduced data) obtained by reproducing the data. Note that when the amount of delay in the level detection circuit 110 is equal to the amount of delay in the Viterbi decoding circuit 109, the shift register 111 can be omitted.

Further, the shift register 111 may be replaced with any delay device.

Next, a function of the amplitude detection circuit 103 will be described.

The amplitude detection circuit 103 has a function of detecting an amplitude of a reproduced signal. When the amplitude of a reproduced signal is less than or equal to a given amplitude, the amplitude detection circuit 103 outputs a control signal for stopping the outputting of the reproduced data in order to secure the reliability of reproduced data. The amplitude detection circuit 103 outputs a High-level signal (or value "1") when the amplitude of a reproduced signal is greater than a given amplitude, and otherwise outputs a Low-level signal (or value "0"). Even when the reproduced signal processing circuit 102 includes an AGC (Automatic Gain Control) circuit, the amplitude detection circuit 103 receives a signal which has not been processed by the AGC circuit. For Verification data recorded as a recorded signal (first recorded signal) in the optical disk medium 301, an amplitude detected by the amplitude detection circuit 103 is the amplitude of the recorded signal. Further, address information is recorded as a second recorded signal in the optical disk medium 301.

With the above-described structure, when the output signal of the amplitude detection circuit 103 is at a Low-level upon a verification operation, the determination of a recording condition of step S1104 is not performed. In other words, the determination section 503 performs the determination of a recording condition, depending on whether an amplitude detected by the amplitude detection circuit 103 is greater than a predetermined amplitude.

Note that the amplitude detection circuit 103 may be omitted (for example, for the purpose of a reduction in cost of the information recording and reproduction apparatus 1).

Next, a description will be given of how the control section 114 generates the ID gate signal 114*a*.

Figure 4:
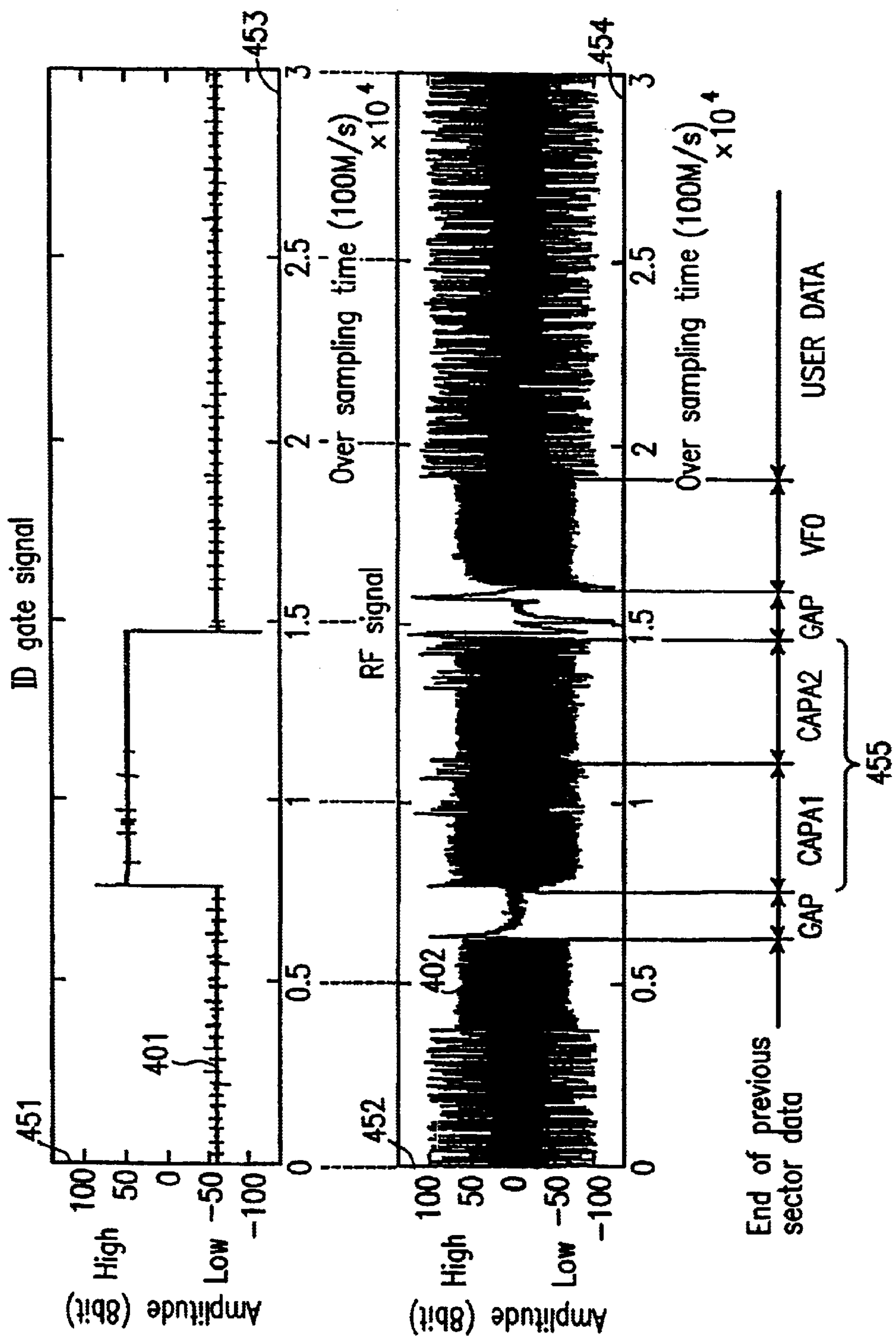
FIG. 4 is a diagram showing an example waveform of an RF signal read out from an optical disk medium in conformity with the DVD-RAM standards and an example waveform of an ID gate signal.

FIG. 4 shows an example of the waveform of an RF signal read out from an optical disk medium in conformity with the DVD-RAM standards, and an example of the waveform of an ID gate signal (reproduced signal). The vertical axes 451 and 452 represent the amplitude of the waveforms 401 and 402, respectively. The horizontal axes 453 and 454 each represent an elapsed time. The waveform 401 is, for example, the waveform of the ID gate signal 114*a* of FIG. 1. The waveform 402 is, for example, the waveform of the reproduced signal 500 of FIG. 1.

The waveform 401 is at a High level in a time zone 455 in which an address region is reproduced, and at a Low level in the other time zones. An ID gate signal having such a waveform is generated, for example, as follows. The control section 114 monitors reproduced data. The ID gate signal is set to the High level only when an address is detected, and otherwise the ID gate signal is set to the Low level. In general, since an address has a specific value (a specific pattern formed in an optical disk medium), the address can be easily distinguished from the other data (e.g., user data). Further, when an optical disk medium is in conformity with a standard where address regions are disposed at predetermined intervals, once an address is detected, the control section 114 may change the level of an ID gate signal based on the predetermined interval without monitoring reproduced data.

In the above-described embodiment, an optical disk medium has physical addresses (propit addresses). In the case of an optical disk such as reproduction-dedicated CD or DVD, physical addresses are generally used. In the case of a rewritable optical disk medium, addresses as well as user data may be recorded at any time. Such an address is herein referred to as a soft address. The present invention can be applied to an optical disk medium having soft addresses.

Figure 5:
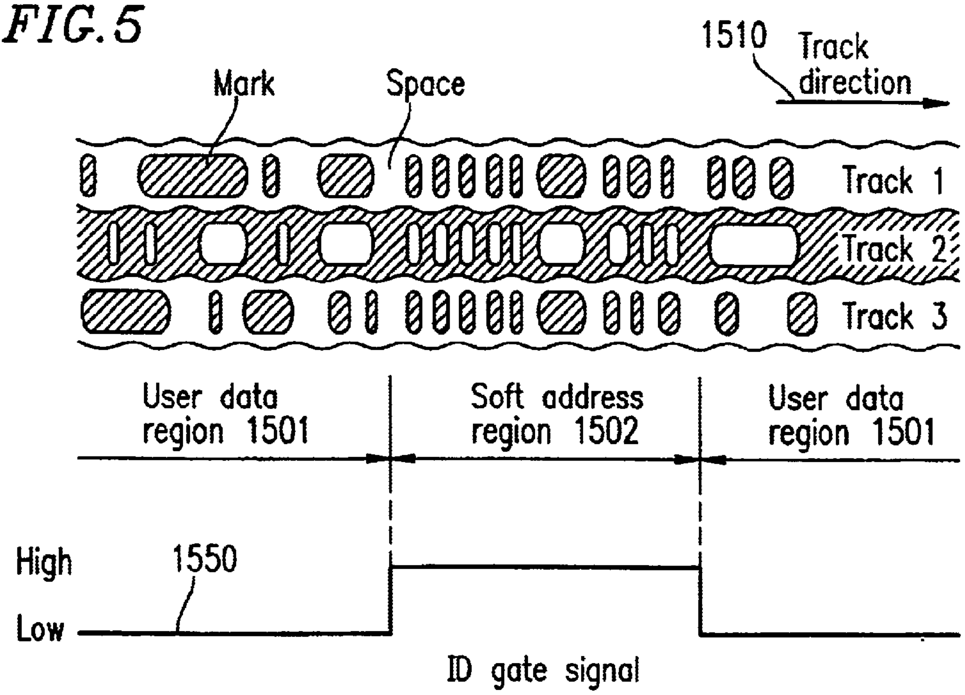
FIG. 5 is a diagram showing a region including a soft address region of an optical disk medium having soft addresses.

FIG. 5 shows a region including a soft address region of an optical disk medium having soft addresses. Three tracks (tracks 1 through 3) each include a user data region 1501 and a soft address region 1502. The user data region 1501 and the soft address region 1502 may be formed at respective predetermined positions in an optical disk medium or at respective arbitrary positions. A mark and a space are provided, depending on recorded data, in the user data region 1501 and the soft address region 1502. Such a mark and space can be produced, for example, by irradiating an optical disk medium with an ON/OFF laser beam using an optical head.

Arrow 1510 indicates a direction in which an optical head is relatively moved with respect to a track in an optical disk medium.

A waveform 1550 indicates the waveform of an ID gate signal. The waveform 1550 shows that the ID gate signal is at a High level when data is read out from the soft address region 1502, and otherwise at a Low level. Such an ID gate signal can be generated in a manner similar to that described with reference to FIG. 4, i.e., as in an optical disk medium having physical addresses.

For an optical disk medium having soft addresses, the information recording and reproduction apparatus 1 of the present invention performs a verification operation in a manner similar to steps S1101 through S1104 described above. Note that in step S1101 the recording section 501 further records address information in the optical disk medium. The address information may be arbitrary address information which allows the mapping of step S1103.

As described above, upon a verification operation for an optical disk medium having soft addresses, address information is recorded along with the verification data. Thus, the recording section 501 records the verification data 565 in a recording medium in accordance with address information. According to the present invention, upon a verification operation for an optical disk medium having soft addresses, even when the recording condition is poor, the probability that address information is correctly reproduced is high. Moreover, the recording condition is strictly checked. Therefore, the reliability of a verification operation can be secured. Note that upon a verification operation for an optical disk medium having soft addresses, address information and verification data are recorded in a given specific area (a region including the soft address region 1502 and the user data region 1501) under the same condition, so that if the recording condition of the user data region 1501 is found, the recording condition of the soft address region 1502 is known.

Figure 6:
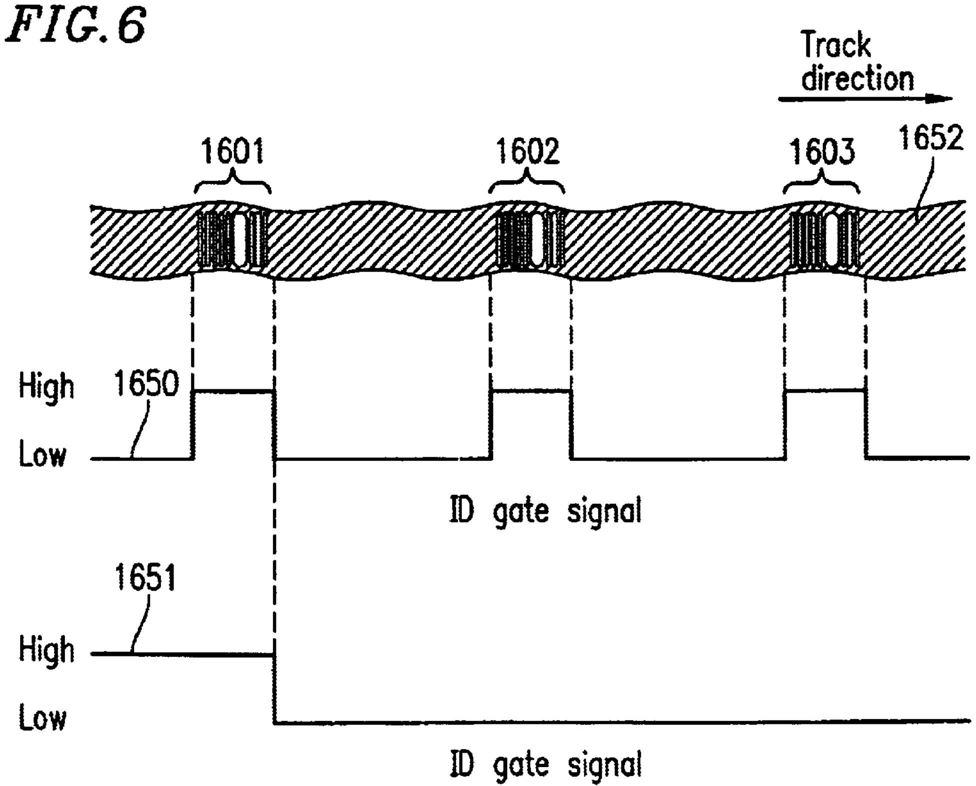
FIG. 6 is a diagram showing an example waveform of an ID gate signal.

FIG. 6 shows an example waveform of an ID gate signal. A track 1652 represents a track provided in an optical disk medium. The optical disk medium including the track 1652 may be an optical disk medium having physical addresses, or an optical disk medium having soft addresses. The track 1652 includes three address regions 1601 through 1603 (physical address regions or soft address regions).

The waveform 1650 shows an example waveform of an ID gate signal. The ID gate signal having the waveform 1650 can be generated by the method of producing an ID gate signal which is described above with reference to FIGS. 4 and 5.

A waveform 1651 represents another example waveform of an ID gate signal. The waveform 1651 shows that in data reproduction upon a verification operation, an ID gate signal is first at a High level, and after a specific address (address region 1601) has been detected, the ID gate signal is at a Low level. When an ID gate signal has the waveform 1651, only address information recorded in the address region 1601 is reproduced in accordance with the PR equalization and Viterbi decoding method. Therefore, the possibility that address information recorded in the address region 1601 is correctly reproduced is increased, whereby the possibility that the mapping in step S1103 is correctly performed is high. Thus, in data reproduction upon a verification operation, address information recorded in at least one region is preferably reproduced in accordance with the PR equalization and Viterbi decoding method. Thereafter, the data mapping can be correctly performed based on the address information and the reproduced address information.

Whether an ID gate signal should have the waveform 1650 or the waveform 1651 is appropriately selected depending on the system specification of the information recording and reproduction apparatus, for example.

In the above-described embodiment, upon a verification operation, data recorded in an address region is reproduced in accordance with the PR equalization and Viterbi decoding method and data recorded in a user data region is reproduced in accordance with the PR equalization and level detection method. Alternatively, data recorded in a user data region may be reproduced in accordance with the reproduction equalization and binary method. When data recorded in a user data region may be reproduced in accordance with the reproduction equalization and binary method, the recording condition of the user data region can be more strictly checked.

Further, for example, the ID gate signal 114*a* may be input to the PR equalization circuit 107. In this case, when the ID gate signal 114*a* is at the Low level, processing operation of the PR equalization circuit 107 may be frozen (to pass a signal from the waveform fluctuation suppression circuit 105 without processing). In this case, a signal from the waveform fluctuation suppression circuit 105 is not PR-equalized, but is subject to level detection by the level detection circuit 110. The resultant signal is substantially identical to a binary signal obtained by converting the signal from the waveform fluctuation suppression circuit 105. Therefore, with such a structure, data recorded in a user data region is reproduced in accordance with the reproduction equalization and binary method, whereby the recording condition of the user data region is more strictly checked.

Further, the second reproduction method used in reproducing data recorded in an address region and the first reproduction method used in reproducing data recorded in a user data region, may be any reproduction methods if the degree of the influence of the recording condition of data recorded in an optical disk medium on whether the data is correctly reproduced is greater when the data is reproduced in accordance with the first reproduction method than when the data is reproduced in accordance with the second reproduction method.

Note that in the above-described embodiment, the verification operation is described only for optical disk media. However, the principle of the present invention can be applied to any other recording media, such as magnetic disk media and magneto-optical disk media.

According to the present-invention, at least one reproduced data is obtained by reproducing at least one data including data (verification data) recorded in a recording medium in a first reproduction method. Further, reproduced address information is obtained by reproducing address information recorded in the recording medium in a second reproduction method. The degree of the influence of the recording condition of data recorded in the recording medium on whether the data is correctly reproduced is greater when the data is reproduced in accordance with the first reproduction method than when the data is reproduced in accordance with the second reproduction method. Therefore, even when the recording condition of address information in a recording medium is poor, the address information can be correctly reproduced. Based on address information and the reproduced address information, the mapping of the verification data to a specific reproduced data of the at least one reproduced data is correctly performed. Further, when the recording condition of verification data in a recording medium is not good, the probability that the verification data is correctly reproduced is low. The recording condition of a region in which the verification data is recorded is determined by comparing the verification data with the specific data, thereby increasing the probability that the recording condition is correctly determined to be poor. Therefore, the recording condition is strictly checked, thereby making it possible to improve the reliability of verification operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information recording and reproduction apparatus comprising:

a recording section for recording data into a recording medium in accordance with address information recorded in the recording medium;

a first reproduction section for reproducing at least one data including the data recorded in the recording medium in accordance with a first reproduction method to obtain at least one reproduced data;

a second reproduction section for reproducing the address information in accordance with a second reproduction method to obtain reproduced address information; and a determination section for mapping the data to a specific reproduced data of the at least one reproduced data based on the address information and the reproduced address information, and comparing the data with the specific reproduced data to determine a recording condition of a region of the recording medium storing the data, wherein the degree of influence of the recording condition of data recorded in the recording medium, on whether the data is correctly reproduced, is greater when the data is reproduced in accordance with the first reproduction method than with the second reproduction method.

2. An information recording and reproduction apparatus according to claim 1, wherein the address information is previously recorded in the form of a prepit in the recording medium.

3. An information recording and reproduction apparatus according to claim 1, wherein the recording section further records the address information into the recording medium.

4. An information recording and reproduction apparatus according to claim 1, wherein: the data is recorded as a recorded signal in the recording medium; the information recording and reproduction apparatus further comprises an amplitude detection section for detecting an amplitude of the recorded signal; and the determination section performs determination of the recording condition, depending on whether the amplitude detected by the amplitude detection section is greater than a predetermined amplitude.

5. An information recording and reproduction apparatus according to claim 1, wherein:

the data is recorded as a first recorded signal in the recording medium;

in the first reproduction method, the first recorded signal is equalized in accordance with a partial response method, and thereafter the equalized first recorded signal is subjected to level detection to obtain the first reproduced data;

the address information is recorded as a second recorded signal in the recording medium; and in the second reproduction method, the second recorded signal is equalized in accordance with the partial response method, and thereafter the equalized second recorded signal is subjected to Viterbi decoding to obtain the second reproduced data.

6. An information recording and reproduction apparatus according to claim 1, wherein a time from when the first reproduction section starts reproducing the data recorded in the recording medium until when the first reproduction section starts outputting reproduced data obtained by reproducing the data, is equal to a time from when the second reproduction section starts reproducing the data recorded in the recording medium until when the second reproduction section starts outputting reproduced data obtained by reproducing the data.

* * * * *

UNITED STATES PATENT AND TRADEMARK OFFICE

CERTIFICATE OF CORRECTION

PATENT NO. : 6,618,337 B2
DATED : September 9, 2003
INVENTOR(S) : Miyashita et al.

It is certified that error appears in the above-identified patent and that said Letters Patent is hereby corrected as shown below:

Title page,
Item [*] Notice, delete the phrase "by 0 days" and insert -- by 364 days --

Signed and Sealed this

Twenty-eighth Day of September, 2004

JON W. DUDAS
*Director of the United States Patent and Trademark Office*